United States Patent
Tang et al.

(10) Patent No.: US 9,570,989 B2
(45) Date of Patent: Feb. 14, 2017

(54) CONTROL CIRCUIT OF POWER CONVERTER WITH ERROR DETECTION CIRCUIT AND REVERSE ADJUSTING CIRCUIT

(71) Applicant: Richtek Technology Corporation, Chupei, Hsinchu (TW)

(72) Inventors: Chien-Fu Tang, Hsinchu (TW); Isaac Y. Chen, Hsinchu County (TW)

(73) Assignee: Ricktek Technology Corporation, Chupei, Hsinchu (TW)

( * ) Notice: Subject to any disclaimer, the term of this patent is extended or adjusted under 35 U.S.C. 154(b) by 49 days.

(21) Appl. No.: 14/669,679

(22) Filed: Mar. 26, 2015

(65) Prior Publication Data

US 2016/0190916 A1    Jun. 30, 2016

(30) Foreign Application Priority Data

Dec. 31, 2014  (CN) .......................... 2014 1 0848700

(51) Int. Cl.
*H02J 1/02*    (2006.01)
*H02M 3/335*    (2006.01)
*H02M 1/00*    (2006.01)

(52) U.S. Cl.
CPC . *H02M 3/33507* (2013.01); *H02M 2001/0003* (2013.01); *H02M 2001/0022* (2013.01); *H02M 2001/0048* (2013.01)

(58) Field of Classification Search
CPC .................. H02M 3/33507; H02M 2001/0003; H02M 2001/0048; H02M 2001/0022

USPC .............. 363/15, 21.01, 21.04, 21.05, 21.08, 363/21.12, 21.13, 21.16, 95, 97
See application file for complete search history.

(56) References Cited

U.S. PATENT DOCUMENTS

| | | | | |
|---|---|---|---|---|
| 6,329,801 B1 * | 12/2001 | Zuniga | ................ | H02M 3/1563 323/282 |
| 7,561,452 B2 * | 7/2009 | Mednik | ............. | H02M 3/33523 363/21.12 |
| 8,624,566 B2 * | 1/2014 | Sohma | .................. | H02M 3/156 323/222 |
| 2010/0046258 A1 * | 2/2010 | Coulson | ............ | H02M 3/33515 363/95 |

* cited by examiner

*Primary Examiner* — Adolf Berhane
*Assistant Examiner* — Nusrat Quddus
(74) *Attorney, Agent, or Firm* — Birch, Stewart, Kolasch & Birch, LLP

(57) ABSTRACT

A control circuit of a power converter includes: an input signal detection circuit, configured to operably detect a magnitude of an input signal to generate a detection signal; a clock generation circuit, configured to operably generate a clock signal; an error detection circuit, configured to operably generate an error signal according to a reference signal and a feedback signal; a control signal generation circuit, coupled with the clock generation circuit and the error detection circuit, configured to operably control a switching frequency of a power switch according to the clock signal and the error signal; and a reverse adjusting circuit, coupled with the input signal detection circuit, configured to operably adjust the clock generation circuit or the control signal generation circuit according to the detection signal to configure the switching frequency of the power switch to be inversely proportional to the magnitude of the input signal.

18 Claims, 3 Drawing Sheets

US 9,570,989 B2

CONTROL CIRCUIT OF POWER CONVERTER WITH ERROR DETECTION CIRCUIT AND REVERSE ADJUSTING CIRCUIT

CROSS-REFERENCE TO RELATED APPLICATIONS

This application claims the benefit of priority to Patent Application No. 201410848700.6, filed in China on Dec. 31, 2014; the entirety of which is incorporated herein by reference for all purposes.

BACKGROUND

The disclosure generally relates to a power converter and, more particularly, to a control circuit applicable to various power converters with different input voltages.

In general, the conduction loss and the switching loss of a power converter are inversely proportional to each other. The best switching frequency of a power switch in the power converter is a switching frequency that minimizes the sum of the conduction loss and the switching loss, which is also the switching frequency that renders the power converter to reach the optimal power conversion efficiency.

The best switching frequency of the power switch varies with several external conditions, such as the input voltage, the output voltage, and the load. For example, the best switching frequency of the power switch in an application where the input voltage is 155V is different from the best switching frequency of the power switch in another application where the input voltage is 230V. Accordingly, the designer of a conventional control circuit is required to adjust the component parameters of the conventional control circuit in advance based on the magnitude of the input voltage of a particular power converter, so that the conventional control circuit is enabled to configure the power switch in the particular to operate at the best switching frequency.

However, the conventional control circuit is unable to dynamically adjust the best switching frequency of the power switch based on the change of the external conditions. Therefore, once the conventional control circuit is employed in other application with different input voltage, the conventional control circuit is unable to configure the power switch to operate at the best switching frequency under the application. As a result, the power conversion efficiency of the power converter would be greatly reduced.

In other words, the structure of the conventional control circuit is only applicable to particular power converters having the same input voltage, and not suitable to other power converter with different input voltage. Apparently, the application scope and application flexibility of the conventional control circuit are very restricted.

SUMMARY

An example embodiment of a control circuit of a power converter is disclosed. The power converter comprises: a primary-side coil, a secondary-side coil, a power switch, and a feedback circuit, wherein the power switch is utilized for controlling electromagnetic induction of energy between the primary-side coil and the secondary-side coil to convert an input signal into an output signal, and the feedback circuit is utilized for generating a feedback signal corresponding to a magnitude of the output signal. The control circuit comprises: an input signal detection circuit, configured to operably detect a magnitude of the input signal to generate a detection signal; a clock generation circuit, configured to operably generate a clock signal; an error detection circuit, configured to operably generate an error signal according to a reference signal and the feedback signal; a control signal generation circuit, coupled with the clock generation circuit and the error detection circuit, configured to operably control a switching frequency of the power switch according to the clock signal and the error signal; and a reverse adjusting circuit, coupled with the input signal detection circuit, configured to operably adjust the clock generation circuit or the control signal generation circuit according to the detection signal to configure the switching frequency of the power switch to be inversely proportional to the magnitude of the input signal.

Another example embodiment of a control circuit of a power converter is disclosed. The power converter comprises: an inductor, one or more power switches, and a feedback circuit, wherein the one or more power switches are utilized for controlling the inductor to store or release energy to convert an input signal into an output signal, and the feedback circuit is utilized for generating a feedback signal corresponding to a magnitude of the output signal. The control circuit comprises: an input signal detection circuit, configured to operably detect a magnitude of the input signal to generate a detection signal; a clock generation circuit, configured to operably generate a clock signal; an error detection circuit, configured to operably generate an error signal according to a reference signal and the feedback signal; a control signal generation circuit, coupled with the clock generation circuit and the error detection circuit, configured to operably control switching frequencies of the one or more power switches according to the clock signal and the error signal; and a reverse adjusting circuit, coupled with the input signal detection circuit, configured to operably adjust the clock generation circuit or the control signal generation circuit according to the detection signal to configure the switching frequencies of the one or more power switches to be inversely proportional to the magnitude of the input signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
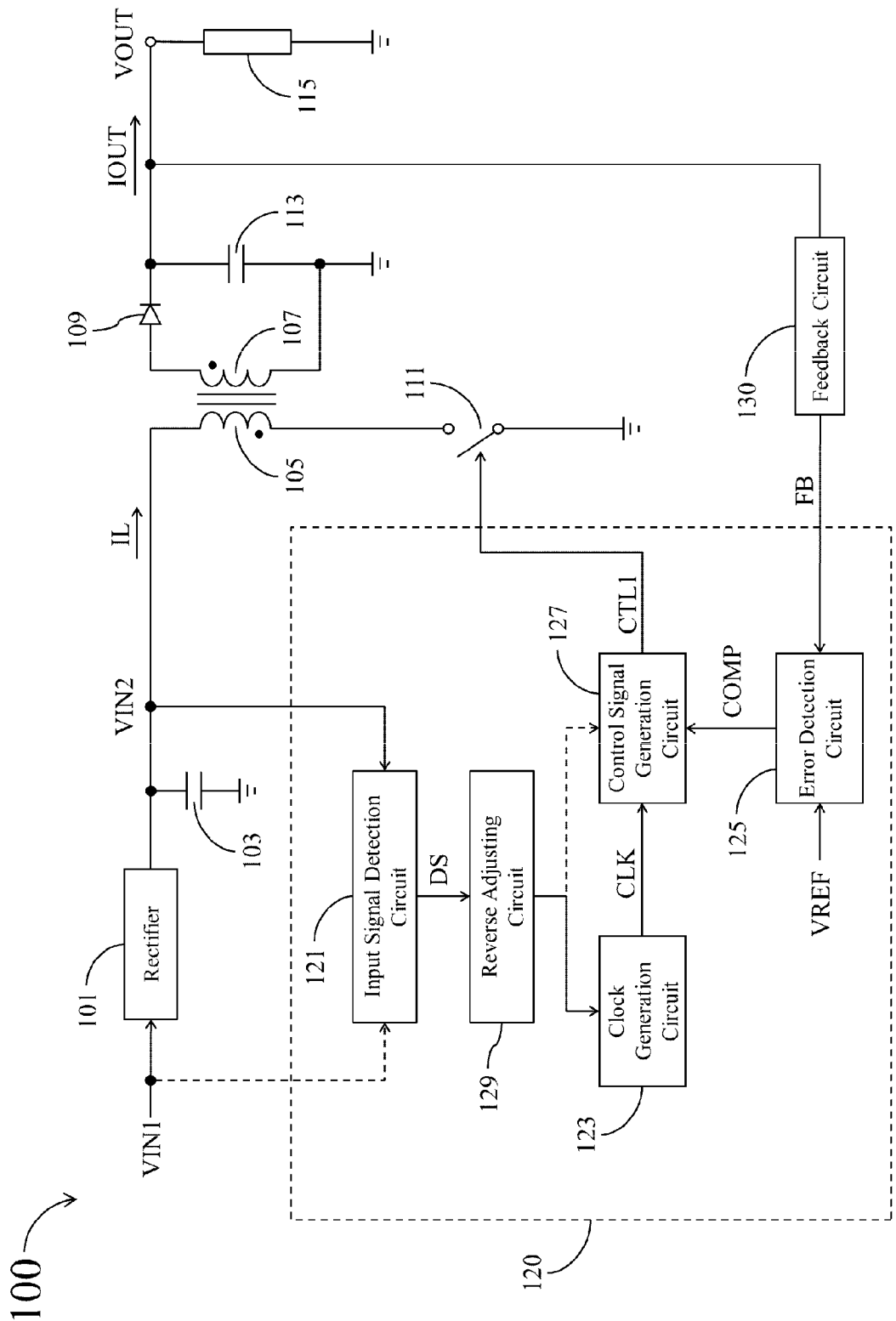
FIG. 1 shows a simplified functional block diagram of a flyback power converter according to one embodiment of the present disclosure.

FIG. 1 shows a simplified functional block diagram of a flyback power converter 100 according to one embodiment of the present disclosure. The flyback power converter 100 comprises a rectifier 101, an input capacitor 103, a primary-side coil 105, a secondary-side coil 107, a diode 109, a first power switch 111, an output capacitor 113, a load 115, a control circuit 120, and a feedback circuit 130.

In the flyback power converter 100, the AC signal VIN1 is an unrectified AC signal, i.e., an AC signal that is not yet rectified by a rectifier. The rectifier 101 is utilized for rectifying the AC signal VIN1 to generate a rectified signal VIN2 having an m-shape waveform. The input capacitor 103 is coupled with the output terminal of the rectifier 101 and utilized for reducing the noise in the rectified signal VIN2. A first terminal of the primary-side coil 105 is coupled with the rectified signal VIN2. A first terminal of the secondary-side coil 107 is utilized for providing the output signal VOUT. The diode 109 is coupled between the first terminal of the secondary-side coil 107 and the load 115. The first power switch 111 is coupled between a second terminal of the primary-side coil 105 and a fixed-voltage terminal (e.g., a ground terminal). The first power switch 111 is utilized for controlling electromagnetic induction of energy between the primary-side coil 105 and the secondary-side coil 107 to convert the AC signal VIN1 or the rectified signal VIN2 into the output signal VOUT. The output capacitor 113 is coupled with the output terminal of the diode 109 to reduce noise in the output signal VOUT.

The control circuit 120 is configured to operably control the switching operations of the first power switch 111 to adjust a current IL passing through the primary-side coil 105, so as to adjust the output signal VOUT by changing the magnitude of a current IOUT passing through the diode 109. The feedback circuit 130 is configured to operably generate a feedback signal FB corresponding to the magnitude of the output signal VOUT.

As shown in FIG. 1, the control circuit 120 comprises an input signal detection circuit 121, a clock generation circuit 123, an error detection circuit 125, a control signal generation circuit 127, and a reverse adjusting circuit 129.

In the control circuit 120, the input signal detection circuit 121 is configured to operably detect a magnitude of an input signal of the flyback power converter 100 to generate a detection signal DS. The clock generation circuit 123 is configured to operably generate a clock signal CLK. The error detection circuit 125 is utilized for coupling with the feedback circuit 130 and configured to operably generate an error signal COMP according to a reference signal VREF and the feedback signal FB. The control signal generation circuit 127 is coupled with the clock generation circuit 123 and the error detection circuit 125. The control signal generation circuit 127 is configured to operably control the switching frequency of the first power switch 111 according to the clock signal CLK and the error signal COMP. The reverse adjusting circuit 129 is coupled with the input signal detection circuit 121 and configured to operably adjust the clock generation circuit 123 or the control signal generation circuit 127 according to the detection signal DS, so as to configure the switching frequency of the first power switch 111 to be inversely proportional to the magnitude of the input signal of the flyback power converter 100. For example, if the magnitude of the input signal of the flyback power converter 100 is VINA, the reverse adjusting circuit 129 may configure the switching frequency of the first power switch 111 to be a frequency FreqA by adjusting the clock generation circuit 123 or the control signal generation circuit 127. If the magnitude of the input signal of the flyback power converter 100 is VINB which is less than VINA, then the reverse adjusting circuit 129 may configure the switching frequency of the first power switch 111 to be a frequency FreqB which is greater than the frequency FreqA by adjusting the clock generation circuit 123 or the control signal generation circuit 127. Please note that the aforementioned inverse proportional relationship between the switching frequency of the power switch and the magnitude of the input signal may be a linear relationship, a curvilinear relationship, a broken line relationship, or any other adequate relationship.

In the embodiment of FIG. 1, each of the unrectified AC signal VIN1 and the rectified signal VIN2 can be regarded as the input signal of the flyback power converter 100.

Different functional blocks of the flyback power converter 100 may be realized with separate circuits, or may be integrated into a single circuit chip. For example, all the functional blocks of the control circuit 120 may be integrated into a single controller IC. The first power switch 111 may be further integrated into the control circuit 120 to form a single converter IC. In practice, the feedback circuit 130 may be further integrated into the control circuit 120.

As described previously, each of the AC signal VIN1 and the rectified signal VIN2 can be regarded as the input signal of the flyback power converter 100. Accordingly, the input signal detected by the input signal detection circuit 121 may be the unrectified AC signal VIN1 or the rectified signal VIN2 generated by the rectifier 101.

In some embodiments where the input signal detected by the input signal detection circuit 121 is the rectified signal VIN2 generated by the rectifier 101, the input signal detection circuit 121 may be configured to operably conduct a sample-and-hold operation on the input signal (i.e., the rectified signal VIN2 in this case) to generate the detection signal DS.

In other embodiments where the input signal detected by the input signal detection circuit 121 is the unrectified AC signal VIN1, the input signal detection circuit 121 may be configured to operably detect the peak values of the input signal (i.e., the AC signal VIN1 in this case) to generate the detection signal DS.

In practice, the control circuit 120 may adopt various known current mode control scheme or voltage mode control scheme in operations.

In some embodiments where the control circuit 120 adopts the current mode control scheme, the control signal generation circuit 127 may utilize various existing circuit structures to detect the current IL passing through the primary-side coil 105 to generate a sensed signal CS (not shown) corresponding to the magnitude of the current IL. The control signal generation circuit 127 may compare the error signal COMP with the sensed signal CS, and apply a predetermined gain on the difference between the error signal COMP and the sensed signal CS to generate a first comparison signal VC1 (not shown). Then, the control signal generation circuit 127 may generate a first control signal CTL1 for controlling the switching frequency of the first power switch 111 according to the clock signal CLK and the first comparison signal VC1. In practice, the control signal generation circuit 127 may utilize various existing PWM signal generating circuits or PFM signal generating circuits to generate the aforementioned first control signal CTL1.

For example, the control signal generation circuit 127 may couple the clock signal CLK to a set terminal of a RS flip-flop (not shown) while couple the first comparison signal VC1 to a reset terminal of the RS flip-flop. As a result, the RS flip-flop can be utilized to generate the aforementioned first control signal CTL1 according to the clock signal CLK and the first comparison signal VC1.

In the embodiments where the control circuit 120 adopts the current mode control scheme, the reverse adjusting circuit 129 may control the clock generation circuit 123 or the control signal generation circuit 127 according to the detection signal DS, so as to configure the switching frequency of the first power switch 111 to be inversely proportional to the magnitude of the input signal of the flyback power converter 100.

For example, the reverse adjusting circuit 129 may control the control signal generation circuit 127 according to the detection signal DS, so that the control signal generation circuit 127 configures the predetermined gain being applied on the difference between the error signal COMP and the sensed signal CS to be inversely proportional to the magnitude of the detection signal DS to thereby adjust the magnitude of the first comparison signal VC1. In this way, the control signal generation circuit 127 changes the switching frequency of the first power switch 111 and renders the switching frequency of the first power switch 111 to be inversely proportional to the magnitude of the input signal (e.g., the AC signal VIN1 or the rectified signal VIN2) of the flyback power converter 100.

Alternatively, the reverse adjusting circuit 129 may control the clock generation circuit 123 according to the detection signal DS, so that the clock generation circuit 123 configures the frequency of the clock signal CLK to be inversely proportional to the magnitude of the detection signal DS to thereby change the switching frequency of the first power switch 111. In this way, the switching frequency of the first power switch 111 can also be configured to be inversely proportional to the magnitude of the input signal of the flyback power converter 100.

In some embodiments where the control circuit 120 adopts the voltage mode control scheme, the control signal generation circuit 127 may utilize various existing circuit structures to generate a periodical ramp signal RAMP (not shown) according to the input signal (e.g., the AC signal VIN1 or the rectified signal VIN2) of the flyback power converter 100, the output signal VOUT of the flyback power converter 100, a particular reference signal, or other signal. Then, the control signal generation circuit 127 compares the ramp signal RAMP with the error signal COMP to generate a second comparison signal VC2 (not shown). The control signal generation circuit 127 may generate a first control signal CTL1 for controlling the switching frequency of the first power switch 111 according to the clock signal CLK and the second comparison signal VC2. Similarly, the control signal generation circuit 127 may utilize various existing PWM signal generating circuits or PFM signal generating circuits to generate the aforementioned first control signal CTL1.

For example, the control signal generation circuit 127 may couple the clock signal CLK to a set terminal of a RS flip-flop (not shown) while couple the second comparison signal VC2 to a reset terminal of the RS flip-flop. As a result, the RS flip-flop can be utilized to generate the aforementioned first control signal CTL1 according to the clock signal CLK and the second comparison signal VC2.

In the embodiments where the control circuit 120 adopts the voltage mode control scheme, the reverse adjusting circuit 129 may control the clock generation circuit 123 or the control signal generation circuit 127 according to the detection signal DS, so as to configure the switching frequency of the first power switch 111 to be inversely proportional to the magnitude of the input signal of the flyback power converter 100.

For example, the reverse adjusting circuit 129 may control the control signal generation circuit 127 to adjust the slope of the ramp signal RAMP according to the detection signal DS to thereby change the switching frequency of the first power switch 111, so as to render the switching frequency of the first power switch 111 to be inversely proportional to the magnitude of the input signal (e.g., the AC signal VIN1 or the rectified signal VIN2) of the flyback power converter 100.

Alternatively, the reverse adjusting circuit 129 may control the clock generation circuit 123 according to the detection signal DS, so that the clock generation circuit 123 configures the frequency of the clock signal CLK to be inversely proportional to the magnitude of the detection signal DS to thereby change the switching frequency of the first power switch 111. In this way, the switching frequency of the first power switch 111 can also be configured to be inversely proportional to the magnitude of the input signal of the flyback power converter 100.

As can be appreciated from the foregoing descriptions, the reverse adjusting circuit 129 dynamically controls the clock generation circuit 123 or the control signal generation circuit 127 according to the detection result of the input signal of the flyback power converter 100 conducted by the input signal detection circuit 121, so as to adjust the switching frequency of the first power switch 111 to render the switching frequency of the first power switch 111 to be inversely proportional to the magnitude of the input signal of the flyback power converter 100.

In other words, the best switching frequency of the first power switch 111 is dynamically determined by the disclosed control circuit 120 in response to the magnitude of the input signal of the flyback power converter 100, and the flyback power converter 100 is thus enabled to have a better power conversion efficiency.

In addition, the disclosed control circuit 120 has a much wider application scope than the conventional control circuit since there is no need to modify the circuit parameters of the control circuit 120 before applying the control circuit 120 to other flyback power converter with different input signal.

Please note that the disclosed control circuit 120 can also be applied to power converters of other structures in addition to the flyback power converters.

Figure 2:
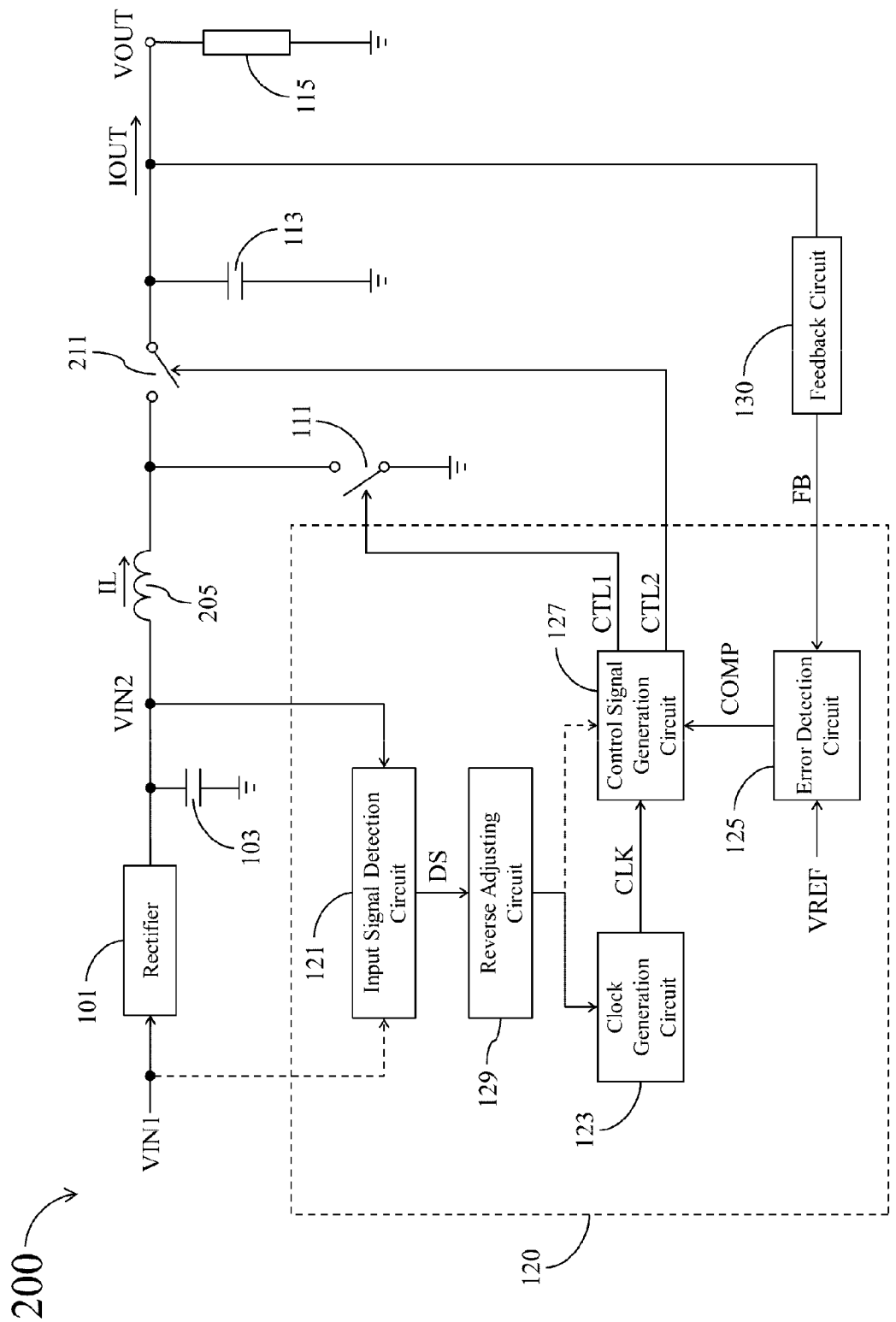
FIG. 2 shows a simplified functional block diagram of a boost power converter according to one embodiment of the present disclosure.

For example, FIG. 2 shows a simplified functional block diagram of a boost power converter 200 according to one embodiment of the present disclosure. The boost power converter 200 comprises the rectifier 101, the input capacitor 103, an inductor 205, the first power switch 111, a second power switch 211, the output capacitor 113, the load 115, the control circuit 120, and the feedback circuit 130.

In the boost power converter 200, the AC signal VIN1 is an unrectified AC signal. The rectifier 101 is utilized for rectifying the AC signal VIN1 to generate the rectified signal VIN2 having an m-shape waveform. The input capacitor 103 is coupled with the output terminal of the rectifier 101 and utilized for reducing the noise in the rectified signal VIN2. A first terminal of the inductor 205 is coupled with the rectified signal VIN2. A second terminal of the inductor 205 is utilized for providing the output signal VOUT. The first power switch 111 is coupled between the second terminal of the inductor 205 and a fixed-voltage terminal (e.g., a ground terminal). The second power switch 211 is coupled between the second terminal of the inductor 205 and the load 115. The first power switch 111 and the second power switch 211 are utilized for controlling the inductor 205 to store or release energy to convert the AC signal VIN1 or the rectified signal VIN2 into the output signal VOUT. The output capacitor 113 is coupled between the second power switch 211 and the load 115 to reduce noise in the output signal VOUT.

The control circuit 120 is configured to operably control the switching operations of the first power switch 111 and the second power switch 211 to adjust a current IL passing through the inductor 205, so as to adjust the output signal VOUT by changing the magnitude of a current IOUT passing through the second power switch 211. The feedback circuit 130 is configured to operably generate the feedback signal FB corresponding to the magnitude of the output signal VOUT.

In the embodiment of FIG. 2, each of the unrectified AC signal VIN1 and the rectified signal VIN2 can be regarded as the input signal of the boost power converter 200.

The operation of the control circuit 120 in FIG. 2 is similar to the embodiment in FIG. 1. One difference between the two embodiments is that the control signal generation circuit 127 in FIG. 2 not only generates a first control signal CTL1 for controlling the switching frequency of the first power switch 111 according to the clock signal CLK and the error signal COMP, but also generates a second control signal CTL2 having a phase substantially opposing to the phase of the first control signal CTL1. The second control signal CTL2 in FIG. 2 is utilized for controlling the switching frequency of the second power switch 211.

The reverse adjusting circuit 129 also adjusts the clock generation circuit 123 or the control signal generation circuit 127 according to the detection signal DS, so as to configure the switching frequencies of the first power switch 111 and the second power switch 211 to be inversely proportional to the magnitude of the input signal of the boost power converter 200. For example, if the magnitude of the input signal of the boost power converter 200 is VINA, the reverse adjusting circuit 129 may configure the switching frequency of the first power switch 111 to be a frequency FreqA by adjusting the clock generation circuit 123 or the control signal generation circuit 127. If the magnitude of the input signal of the boost power converter 200 is VINB which is less than VINA, then the reverse adjusting circuit 129 may configure the switching frequency of the first power switch 111 to be a frequency FreqB which is greater than the frequency FreqA by adjusting the clock generation circuit 123 or the control signal generation circuit 127. Please note that the aforementioned inverse proportional relationship between the switching frequency of the power switch and the magnitude of the input signal may be a linear relationship, a curvilinear relationship, a broken line relationship, or any other adequate relationship.

The foregoing descriptions regarding the implementations, operations, varieties, and related advantage of other corresponding functional blocks of the control circuit 120 in FIG. 1 are also applicable to the embodiment of FIG. 2. For the sake of brevity, those descriptions will not be repeated here.

Different functional blocks of the boost power converter 200 may be realized with separate circuits, or may be integrated into a single circuit chip. For example, all the functional blocks of the control circuit 120 may be integrated into a single controller IC. At least one of the first power switch 111 and the second power switch 211 may be further integrated into the control circuit 120 to form a single converter IC. In practice, the feedback circuit 130 may be further integrated into the control circuit 120.

As can be appreciated from the foregoing descriptions, the reverse adjusting circuit 129 dynamically controls the clock generation circuit 123 or the control signal generation circuit 127 according to the detection result of the input signal of the boost power converter 200 conducted by the input signal detection circuit 121, so as to adjust the switching frequencies of the first power switch 111 and the second power switch 211 to render the switching frequencies of the first power switch 111 and the second power switch 211 to be inversely proportional to the magnitude of the input signal of the boost power converter 200.

In other words, the best switching frequencies of the first power switch 111 and the second power switch 211 are dynamically determined by the disclosed control circuit 120 in response to the magnitude of the input signal of the boost power converter 200, and the boost power converter 200 is thus enabled to have a better power conversion efficiency.

Additionally, in some embodiments, the second power switch 211 in the aforementioned boost power converter 200 may be replaced by a diode. That is, the disclosed control circuit 120 is also applicable to asynchronous-type boost power converters. In this situation, the control circuit 120 needs not to output the second control signal CTL2, and thus the corresponding signal pin can be omitted.

The disclosed control circuit 120 has a much wider application scope than the conventional control circuit since there is no need to modify the circuit parameters of the control circuit 120 before applying the control circuit 120 to other boost power converter with different input signal.

Figure 3:
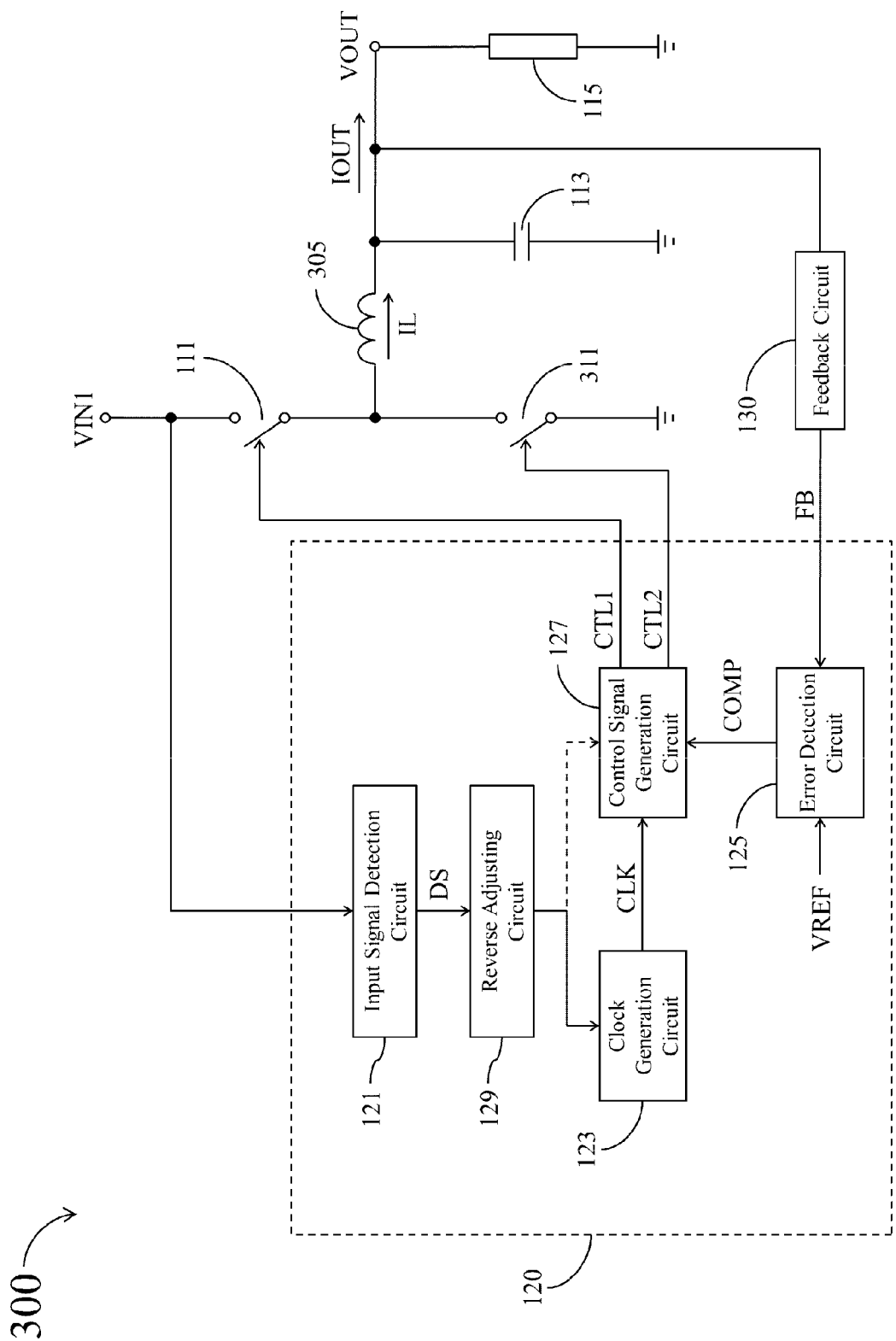
FIG. 3 shows a simplified functional block diagram of a buck power converter according to one embodiment of the present disclosure.

Please refer to FIG. 3, which shows a simplified functional block diagram of a buck power converter 300 according to one embodiment of the present disclosure. The buck power converter 300 comprises an inductor 305, the first power switch 111, a second power switch 311, the output capacitor 113, the load 115, the control circuit 120, and the feedback circuit 130.

In the buck power converter 300, the input signal VIN1 is typically a direct current (DC) signal. A first terminal of the inductor 305 is coupled with the input signal VIN1. A second terminal of the inductor 305 is utilized for providing the output signal VOUT. The first power switch 111 is coupled between the input signal VIN1 and the first terminal of the inductor 305. The second power switch 311 is coupled between the first terminal of the inductor 305 and a fixed-voltage terminal (e.g., a ground terminal). The first power switch 111 and the second power switch 311 are utilized for controlling the inductor 305 to store or release energy to convert the input signal VIN1 into the output signal VOUT. The output capacitor 113 is coupled between the inductor 305 and the load 115 to reduce noise in the output signal VOUT.

The control circuit 120 is configured to operably control the switching operations of the first power switch 111 and the second power switch 311 to adjust a current IL passing through the inductor 305, so as to adjust the output signal VOUT by changing the magnitude of the output current IOUT. The feedback circuit 130 is also configured to operably generate the feedback signal FB corresponding to the magnitude of the output signal VOUT.

The operation of the control circuit 120 in FIG. 3 is similar to the embodiment in FIG. 1. One difference between the two embodiments is that the control signal generation circuit 127 in FIG. 3 not only generates a first control signal CTL1 for controlling the switching frequency of the first power switch 111 according to the clock signal CLK and the error signal COMP, but also generates a second control signal CTL2 having a phase substantially opposing to the phase of the first control signal CTL1. The second control signal CTL2 in FIG. 3 is utilized for controlling the switching frequency of the second power switch 311.

In operations, the input signal detection circuit 121 may detect the magnitude of the input signal VIN1 to generate the detection signal DS. The reverse adjusting circuit 129 also adjusts the clock generation circuit 123 or the control signal generation circuit 127 according to the detection signal DS, so as to configure the switching frequencies of the first power switch 111 and the second power switch 311 to be inversely proportional to the magnitude of the input signal of the buck power converter 300. For example, if the magnitude of the input signal of the buck power converter 300 is VINA, the reverse adjusting circuit 129 may configure the switching frequency of the first power switch 111 to be a frequency FreqA by adjusting the clock generation circuit 123 or the control signal generation circuit 127. If the magnitude of the input signal of the buck power converter 300 is VINB which is less than VINA, then the reverse adjusting circuit 129 may configure the switching frequency of the first power switch 111 to be a frequency FreqB which is greater than the frequency FreqA by adjusting the clock generation circuit 123 or the control signal generation circuit 127. Please note that the aforementioned inverse proportional relationship between the switching frequency of the power switch and the magnitude of the input signal may be a linear relationship, a curvilinear relationship, a broken line relationship, or any other adequate relationship.

The foregoing descriptions regarding the implementations, operations, varieties, and related advantage of other corresponding functional blocks of the control circuit 120 in FIG. 1 are also applicable to the embodiment of FIG. 3. For the sake of brevity, those descriptions will not be repeated here.

Different functional blocks of the buck power converter 300 may be realized with separate circuits, or may be integrated into a single circuit chip. For example, all the functional blocks of the control circuit 120 may be integrated into a single controller IC. At least one of the first power switch 111 and the second power switch 311 may be further integrated into the control circuit 120 to form a single converter IC. In practice, the feedback circuit 130 may be further integrated into the control circuit 120.

As can be appreciated from the foregoing descriptions, the reverse adjusting circuit 129 dynamically controls the clock generation circuit 123 or the control signal generation circuit 127 according to the detection result of the input signal of the buck power converter 300 conducted by the input signal detection circuit 121, so as to adjust the switching frequencies of the first power switch 111 and the second power switch 311 to render the switching frequencies of the first power switch 111 and the second power switch 311 to be inversely proportional to the magnitude of the input signal of the buck power converter 300.

In other words, the best switching frequencies of the first power switch 111 and the second power switch 311 are dynamically determined by the disclosed control circuit 120 in response to the magnitude of the input signal of the buck power converter 300, and the buck power converter 300 is thus enabled to have a better power conversion efficiency.

Additionally, in some embodiments, the second power switch 311 in the aforementioned buck power converter 300 may be replaced by a diode. That is, the disclosed control circuit 120 is also applicable to asynchronous-type buck power converters. In this situation, the control circuit 120 needs not to output the second control signal CTL2, and thus the corresponding signal pin can be omitted.

The disclosed control circuit 120 has a much wider application scope than the conventional control circuit since there is no need to modify the circuit parameters of the control circuit 120 before applying the control circuit 120 to other buck power converter with different input signal.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a power converter, the power converter comprising: a primary-side coil, a secondary-side coil, a power switch, and a feedback circuit, wherein the power switch is utilized for controlling electromagnetic induction of energy between the primary-side coil and the secondary-side coil to convert an input signal into an output signal, and the feedback circuit is utilized for generating a feedback signal corresponding to a magnitude of the output signal, the control circuit comprising:
  an input signal detection circuit, configured to operably detect a magnitude of the input signal to generate a detection signal;
  a clock generation circuit, configured to operably generate a clock signal;
  an error detection circuit, configured to operably generate an error signal according to a reference signal and the feedback signal;
  a control signal generation circuit, coupled with the clock generation circuit and the error detection circuit, configured to operably control a switching frequency of the power switch according to the clock signal and the error signal; and
  a reverse adjusting circuit, coupled with the input signal detection circuit, configured to operably adjust the clock generation circuit or the control signal generation circuit according to the detection signal to configure the switching frequency of the power switch to be inversely proportional to the magnitude of the input signal,
  wherein the reverse adjusting circuit controls the clock generation circuit according to the detection signal, so that the clock generation circuit configures a frequency of the clock signal to be inversely proportional to a magnitude of the detection signal to thereby change the switching frequency of the power switch.

2. A control circuit of a power converter, the power converter comprising: a primary-side coil, a secondary-side coil, a power switch, and a feedback circuit, wherein the power switch is utilized for controlling electromagnetic induction of energy between the primary-side coil and the secondary-side coil to convert an input signal into an output signal, and the feedback circuit is utilized for generating a feedback signal corresponding to a magnitude of the output signal, the control circuit comprising:

an input signal detection circuit, configured to operably detect a magnitude of the input signal to generate a detection signal;

a clock generation circuit, configured to operably generate a clock signal;

an error detection circuit, configured to operably generate an error signal according to a reference signal and the feedback signal;

a control signal generation circuit, coupled with the clock generation circuit and the error detection circuit, configured to operably control a switching frequency of the power switch according to the clock signal and the error signal; and a reverse adjusting circuit, coupled with the input signal detection circuit, configured to operably adjust the clock generation circuit or the control signal generation circuit according to the detection signal to configure the switching frequency of the power switch to be inversely proportional to the magnitude of the input signal;

wherein the control signal generation circuit is further configured to operably apply a predetermined gain on a difference between the error signal and a sensed signal to generate a first comparison signal, and to operably control the switching frequency of the power switch according to the clock signal and the first comparison signal; and wherein the sensed signal corresponds to a magnitude of a current passing through the primary-side coil, and the reverse adjusting circuit controls the control signal generation circuit according to the detection signal, so that the control signal generation circuit configures the predetermined gain to be inversely proportional to a magnitude of the detection signal to thereby change the switching frequency of the power switch.

3. A control circuit of a power converter, the power converter comprising: a primary-side coil, a secondary-side coil, a power switch, and a feedback circuit, wherein the power switch is utilized for controlling electromagnetic induction of energy between the primary-side coil and the secondary-side coil to convert an input signal into an output signal, and the feedback circuit is utilized for generating a feedback signal corresponding to a magnitude of the output signal, the control circuit comprising:

an input signal detection circuit, configured to operably detect a magnitude of the input signal to generate a detection signal;

a clock generation circuit, configured to operably generate a clock signal;

an error detection circuit, configured to operably generate an error signal according to a reference signal and the feedback signal;

a control signal generation circuit, coupled with the clock generation circuit and the error detection circuit, configured to operably control a switching frequency of the power switch according to the clock signal and the error signal; and a reverse adjusting circuit, coupled with the input signal detection circuit, configured to operably adjust the clock generation circuit or the control signal generation circuit according to the detection signal to configure the switching frequency of the power switch to be inversely proportional to the magnitude of the input signal;

wherein the control signal generation circuit is further configured to operably generate a periodical ramp signal, to operably compare the ramp signal with the error signal to generate a second comparison signal, and to operably control the switching frequency of the power switch according to the second comparison signal and the clock signal; and wherein the reverse adjusting circuit controls the control signal generation circuit to adjust a slope of the ramp signal according to the detection signal to thereby change the switching frequency of the power switch.

4. The control circuit of claim 3, wherein the power converter further comprises a rectifier utilized for rectifying an AC signal to generate the input signal;

wherein the input signal detection circuit is configured to operably conduct a sample-and-hold operation on the input signal to generate the detection signal.

5. The control circuit of claim 3, wherein the input signal is an unrectified AC signal and the input signal detection circuit is configured to operably detect peak values of the input signal to generate the detection signal.

6. A control circuit of a power converter, the power converter comprising: an inductor, one or more power switches, and a feedback circuit, wherein the one or more power switches are utilized for controlling the inductor to store or release energy to convert an input signal into an output signal, and the feedback circuit is utilized for generating a feedback signal corresponding to a magnitude of the output signal, the control circuit comprising:

an input signal detection circuit, configured to operably detect a magnitude of the input signal to generate a detection signal;

a clock generation circuit, configured to operably generate a clock signal;

an error detection circuit, configured to operably generate an error signal according to a reference signal and the feedback signal;

a control signal generation circuit, coupled with the clock generation circuit and the error detection circuit, configured to operably control switching frequencies of the one or more power switches according to the clock signal and the error signal; and a reverse adjusting circuit, coupled with the input signal detection circuit, configured to operably adjust the clock generation circuit or the control signal generation circuit according to the detection signal to configure the switching frequencies of the one or more power switches to be inversely proportional to the magnitude of the input signal, wherein the reverse adjusting circuit controls the clock generation circuit according to the detection signal, so that the clock generation circuit configures a frequency of the clock signal to be inversely proportional to a magnitude of the detection signal to thereby change the switching frequencies of the one or more power switches.

7. A control circuit of a power converter, the power converter comprising: an inductor, one or more power switches, and a feedback circuit, wherein the one or more power switches are utilized for controlling the inductor to store or release energy to convert an input signal into an output signal, and the feedback circuit is utilized for generating a feedback signal corresponding to a magnitude of the output signal, the control circuit comprising:

an input signal detection circuit, configured to operably detect a magnitude of the input signal to generate a detection signal;

a clock generation circuit, configured to operably generate a clock signal;

an error detection circuit, configured to operably generate an error signal according to a reference signal and the feedback signal;

a control signal generation circuit, coupled with the clock generation circuit and the error detection circuit, configured to operably control switching frequencies of the one or more power switches according to the clock signal and the error signal; and a reverse adjusting circuit, coupled with the input signal detection circuit, configured to operably adjust the clock generation circuit or the control signal generation circuit according to the detection signal to configure the switching frequencies of the one or more power switches to be inversely proportional to the magnitude of the input signal;

wherein the control signal generation circuit is further configured to operably apply a predetermined gain on a difference between the error signal and a sensed signal to generate a first comparison signal, and to operably control the switching frequencies of the one or more power switches according to the clock signal and the first comparison signal; and wherein the sensed signal corresponds to a magnitude of a current passing through the inductor, and the reverse adjusting circuit controls the control signal generation circuit according to the detection signal, so that the control signal generation circuit configures the predetermined gain to be inversely proportional to a magnitude of the detection signal to thereby change the switching frequencies of the one or more power switches.

8. A control circuit of a power converter, the power converter comprising: an inductor, one or more power switches, and a feedback circuit, wherein the one or more power switches are utilized for controlling the inductor to store or release energy to convert an input signal into an output signal, and the feedback circuit is utilized for generating a feedback signal corresponding to a magnitude of the output signal, the control circuit comprising:

an input signal detection circuit, configured to operably detect a magnitude of the input signal to generate a detection signal;

a clock generation circuit, configured to operably generate a clock signal;

an error detection circuit, configured to operably generate an error signal according to a reference signal and the feedback signal;

a control signal generation circuit, coupled with the clock generation circuit and the error detection circuit, configured to operably control switching frequencies of the one or more power switches according to the clock signal and the error signal; and a reverse adjusting circuit, coupled with the input signal detection circuit, configured to operably adjust the clock generation circuit or the control signal generation circuit according to the detection signal to configure the switching frequencies of the one or more power switches to be inversely proportional to the magnitude of the input signal;

wherein the control signal generation circuit is further configured to operably generate a periodical ramp signal, to operably compare the ramp signal with the error signal to generate a second comparison signal, and to operably control the switching frequencies of the one or more power switches according to the second comparison signal and the clock signal; and wherein the reverse adjusting circuit controls the control signal generation circuit to adjust a slope of the ramp signal according to the detection signal to thereby change the switching frequencies of the one or more power switches.

9. The control circuit of claim 8, wherein the power converter further comprises a rectifier utilized for rectifying an AC signal to generate the input signal;

wherein the input signal detection circuit is configured to operably conduct a sample-and-hold operation on the input signal to generate the detection signal.

10. The control circuit of claim 8, wherein the input signal is an unrectified AC signal and the input signal detection circuit is configured to operably detect peak values of the input signal to generate the detection signal.

11. The control circuit of claim 1, wherein the power converter further comprises a rectifier utilized for rectifying an AC signal to generate the input signal;

wherein the input signal detection circuit is configured to operably conduct a sample-and-hold operation on the input signal to generate the detection signal.

12. The control circuit of claim 1, wherein the input signal is an unrectified AC signal and the input signal detection circuit is configured to operably detect peak values of the input signal to generate the detection signal.

13. The control circuit of claim 2, wherein the power converter further comprises a rectifier utilized for rectifying an AC signal to generate the input signal;

wherein the input signal detection circuit is configured to operably conduct a sample-and-hold operation on the input signal to generate the detection signal.

14. The control circuit of claim 2, wherein the input signal is an unrectified AC signal and the input signal detection circuit is configured to operably detect peak values of the input signal to generate the detection signal.

15. The control circuit of claim 6, wherein the power converter further comprises a rectifier utilized for rectifying an AC signal to generate the input signal;

wherein the input signal detection circuit is configured to operably conduct a sample-and-hold operation on the input signal to generate the detection signal.

16. The control circuit of claim 6, wherein the input signal is an unrectified AC signal and the input signal detection circuit is configured to operably detect peak values of the input signal to generate the detection signal.

17. The control circuit of claim 7, wherein the power converter further comprises a rectifier utilized for rectifying an AC signal to generate the input signal;

wherein the input signal detection circuit is configured to operably conduct a sample-and-hold operation on the input signal to generate the detection signal.

18. The control circuit of claim 7, wherein the input signal is an unrectified AC signal and the input signal detection circuit is configured to operably detect peak values of the input signal to generate the detection signal.

* * * * *